US010093308B2

(12) United States Patent
Sugai

(10) Patent No.: US 10,093,308 B2
(45) Date of Patent: Oct. 9, 2018

(54) ELECTRONIC STABILITY CONTROL SYSTEM FOR VEHICLE

(71) Applicant: NTN CORPORATION, Osaka (JP)

(72) Inventor: Tomohiro Sugai, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/445,086

(22) Filed: Feb. 28, 2017

(65) Prior Publication Data

US 2017/0166203 A1 Jun. 15, 2017

Related U.S. Application Data

(63) Continuation of application No. PCT/JP2015/074183, filed on Aug. 27, 2015.

(30) Foreign Application Priority Data

Sep. 1, 2014 (JP) ................................ 2014-177107

(51) Int. Cl.
*B60L 15/20* (2006.01)
*B60L 7/24* (2006.01)
(Continued)

(52) U.S. Cl.
CPC ............... *B60W 30/02* (2013.01); *B60K 1/02* (2013.01); *B60K 7/0007* (2013.01); *B60L 7/10* (2013.01);
(Continued)

(58) Field of Classification Search
CPC .. B60W 30/02; B60W 30/045; B60W 10/184; B60W 10/08; B60W 2510/207;
(Continued)

(56) References Cited

U.S. PATENT DOCUMENTS 5,222,568 A 6/1993 Higasa et al.
5,465,806 A 11/1995 Higasa et al.
(Continued)

FOREIGN PATENT DOCUMENTS

CN 102481930 A 5/2012
CN 103419838 A 12/2013
(Continued)

OTHER PUBLICATIONS

International Search Report dated Nov. 10, 2015 in corresponding International Application No. PCT/JP2015/074183.
(Continued)

*Primary Examiner* — Michael J Zanelli

(57) ABSTRACT

A vehicle electronic stability control system which allows a vehicle to have improved movement performance and limit performance without causing a driver to feel uncomfortable, by actuating electronic stability control from a state where a lateral slip is relatively less likely to occur. The system prevents a skid of a vehicle. The system is provided with a stability determination module that obtains information indicating vehicle behavior from a sensor, and determines whether the vehicle is in an unstable or less stable state, on the basis of the information. The system is further provided with a braking/driving force control module which, when the stability determination module determines that the vehicle is in the unstable or less stable state, applies a braking force to one of the drive wheels, and simultaneously applies a driving force to the motor for the other drive wheel.

13 Claims, 4 Drawing Sheets

(51) Int. Cl.

| | |
|---|---|
| ***B60T 8/17*** | (2006.01) |
| ***B60T 8/1755*** | (2006.01) |
| ***B60W 30/02*** | (2012.01) |
| ***B60K 1/02*** | (2006.01) |
| ***B60K 7/00*** | (2006.01) |
| ***B60L 7/10*** | (2006.01) |
| ***B60L 7/26*** | (2006.01) |
| ***B60W 10/08*** | (2006.01) |
| ***B60W 10/184*** | (2012.01) |
| *B60W 30/045* | (2012.01) |

(52) U.S. Cl.

CPC .................. *B60L 7/24* (2013.01); *B60L 7/26* (2013.01); *B60L 15/20* (2013.01); *B60T 8/17* (2013.01); *B60T 8/1755* (2013.01); *B60W 10/08* (2013.01); *B60W 10/184* (2013.01); *B60T 2270/303* (2013.01); *B60W 30/045* (2013.01); *B60W 2510/207* (2013.01); *B60W 2520/10* (2013.01); *B60W 2520/125* (2013.01); *B60W 2520/14* (2013.01); *B60Y 2300/02* (2013.01); *B60Y 2300/045* (2013.01); *B60Y 2300/60* (2013.01); *B60Y 2300/89* (2013.01); *Y02T 10/7275* (2013.01)

(58) Field of Classification Search

CPC ... B60W 2520/14; B60K 7/0007; B60K 7/24; B60K 1/02; B60L 7/10; B60L 7/26; B60L 7/24; B60L 15/20; B60T 8/1755; B60Y 2300/02; B60Y 2300/045

See application file for complete search history.

(56) References Cited

U.S. PATENT DOCUMENTS

| | | | | |
|---|---|---|---|---|
| 5,927,829 | A * | 7/1999 | Saga | B60T 8/448 180/165 |
| 6,842,683 | B2 | 1/2005 | Kim | |
| 8,521,349 | B2 | 8/2013 | Yu et al. | |
| 8,764,126 | B2 | 7/2014 | Wu et al. | |
| 8,989,981 | B2 | 3/2015 | Yamakado et al. | |
| 9,296,374 | B2 | 3/2016 | Yamakado et al. | |
| 2003/0125847 | A1 * | 7/2003 | Tinskey | B60K 6/46 701/1 |
| 2003/0163237 | A1 * | 8/2003 | Kim | B60T 8/1755 701/70 |
| 2008/0221766 | A1 * | 9/2008 | Maeda | B60T 8/1755 701/70 |
| 2011/0307129 | A1 | 12/2011 | Yu et al. | |
| 2012/0150376 | A1 * | 6/2012 | Ash | B60L 7/26 701/22 |
| 2012/0179349 | A1 | 7/2012 | Yamakado et al. | |
| 2012/0280562 | A1 * | 11/2012 | Wu | B60T 1/10 303/152 |
| 2014/0222309 | A1 * | 8/2014 | Yamakado | B60T 8/1755 701/89 |
| 2015/0239442 | A1 | 8/2015 | Yamakado et al. | |

FOREIGN PATENT DOCUMENTS

| | | |
|---|---|---|
| CN | 103596821 A | 2/2014 |
| EP | 1 338 490 A2 | 8/2003 |
| EP | 2 484 572 A1 | 8/2012 |
| JP | 2-262806 | 10/1990 |
| JP | 9-86378 | 3/1997 |
| JP | 2005-184971 | 7/2005 |
| JP | 2006-327335 | 12/2006 |
| JP | 2011-162145 | 8/2011 |
| JP | 2014-69766 | 4/2014 |
| WO | WO 2012/151344 A1 | 11/2012 |

OTHER PUBLICATIONS

International Preliminary Report on Patentability dated Mar. 16, 2017 in corresponding International Patent Application No. PCT/JP2015/074183.

Extended European Search Report dated Apr. 6, 2018, in corresponding European Patent Application No. 15838207.7, 10 pgs.

Office Action dated Aug. 2, 2018 in corresponding Chinese Patent Application No. 201580046548.2, 18 pgs.

* cited by examiner

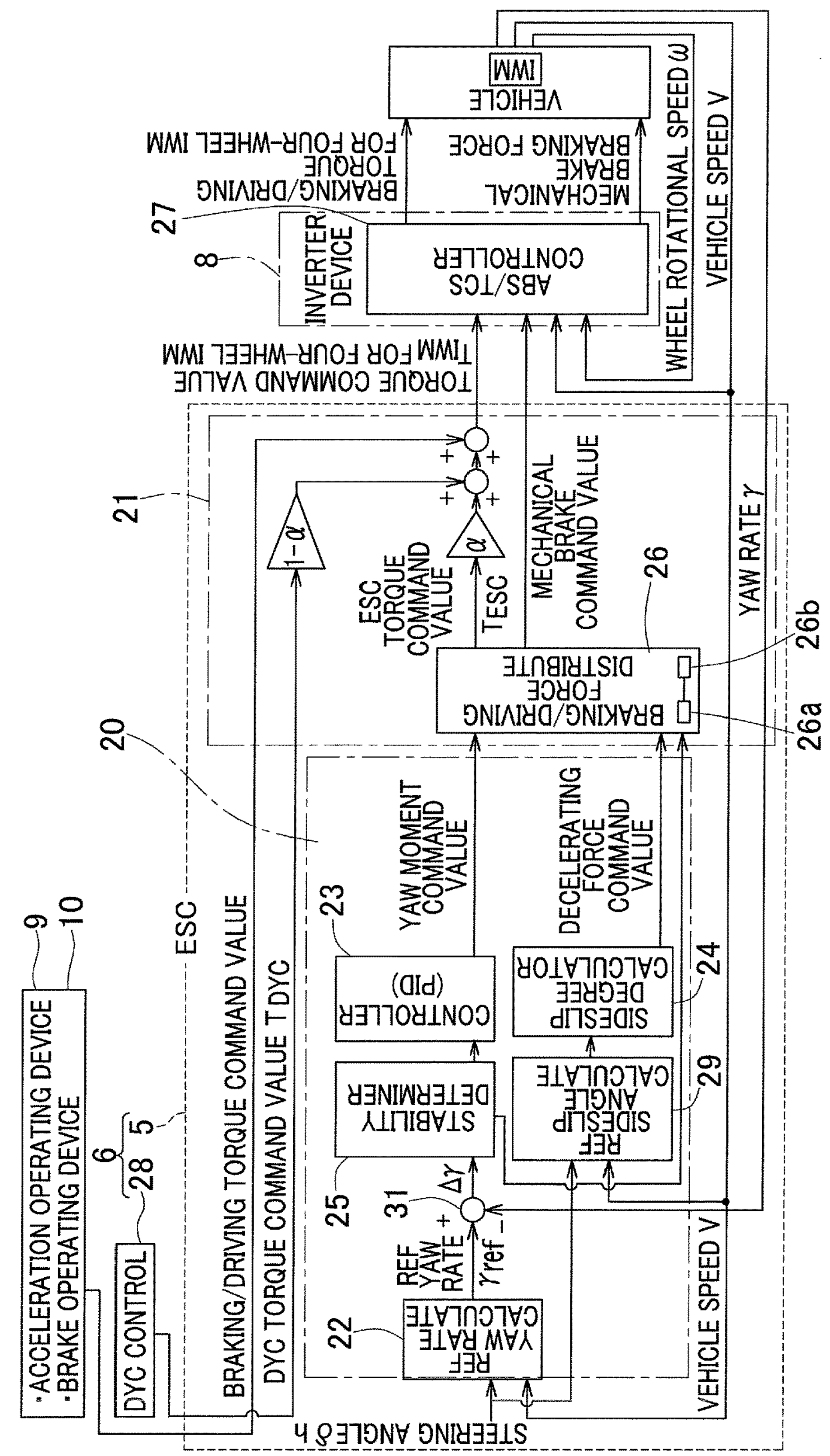
Fig. 3
・ACCELERATION OPERATING DEVICE
・BRAKE OPERATING DEVICE
9
10
DYC CONTROL
6
28
5
ESC
BRAKING/DRIVING TORQUE COMMAND VALUE
DYC TORQUE COMMAND VALUE TDYC
STEERING ANGLE δh
VEHICLE SPEED V
REF YAW RATE CALCULATE
22
REF YAW RATE
γref_
+
31
Δγ
25
STABILITY DETERMINER
CONTROLLER (PID)
23
REF SIDESLIP ANGLE CALCULATE
29
SIDESLIP DEGREE CALCULATOR
24
YAW MOMENT COMMAND VALUE
DECELERATING FORCE COMMAND VALUE
20
BRAKING/DRIVING FORCE DISTRIBUTE
26a
26b
26
ESC TORQUE COMMAND VALUE
TESC
MECHANICAL BRAKE COMMAND VALUE
α
1−α
21
YAW RATE γ
TORQUE COMMAND VALUE
TIWM FOR FOUR-WHEEL IWM
ABS/TCS CONTROLLER
INVERTER DEVICE
8
27
BRAKING/DRIVING TORQUE FOR FOUR-WHEEL IWM
MECHANICAL BRAKE BRAKING FORCE
VEHICLE
IWM
WHEEL ROTATIONAL SPEED ω
VEHICLE SPEED V

ELECTRONIC STABILITY CONTROL SYSTEM FOR VEHICLE

CROSS REFERENCE TO THE RELATED APPLICATION

This application is a continuation application, under 35 U.S.C. § 111(a), of international application No. PCT/JP2015/074183, filed Aug. 27, 2015, which claims Convention priority to Japanese patent application No. 2014-177107, filed Sep. 1, 2014, the entire disclosure of which is herein incorporated by reference as a part of this application.

BACKGROUND OF THE INVENTION

Field of the Invention

The present invention relates to an electronic stability control system for vehicle, which improves cornering performance and stabilizes vehicle behavior in a cornering limit region. Particularly, the present invention relates to an electronic stability control system for an in-wheel motor vehicle.

Description of Related Art

Among conventionally known techniques for controlling the orientation of a vehicle is a control device for preventing a skid (electronic stability control, abbreviated to ESC). The electronic stability control system performs control so that a vehicle travels on a desired path, by applying a braking force to a wheel so that the vehicle is prevented from being in an oversteer state or in an understeer state (e.g., Patent Document 1).

Driving force distribution control has been proposed in which a yaw moment is controlled by changing the ratio of driving forces distributed to left and right drive wheels. As the above driving force distribution control, a technique is known in which a deviation between a reference yaw rate calculated from a vehicle speed and a steering angle and an actual yaw rate detected by a yaw rate sensor is calculated, and the operations of a driving force distribution device and an electronic stability control system are controlled according to the deviation (e.g., Patent Document 2).

RELATED DOCUMENT

Patent Document

[Patent Document 1] Laid-open Patent Publication No. 2011-162145

[Patent Document 2] JP Laid-open Patent Publication No. H09-86378

SUMMARY OF THE INVENTION

While an electronic stability control system which applies a braking force to a wheel to be controlled using a brake can generate a great yaw moment, such an electronic stability control system has a problem that a deceleration is caused in a vehicle body during the operation of the electronic stability control system, which causes the driver feel uncomfortable. Furthermore, when a friction brake is used to generate a braking force, the kinetic energy of a vehicle dissipates as thermal energy, leading to a decrease in electrical efficiency, that is, an increase in electric consumption.

If a threshold for taking measures to prevent a skid is set to low, a deceleration is caused even in a situation where a lateral slip is relatively less likely to occur, leading to a decrease in traveling performance. However, if the threshold is set to high in order to improve traveling performance, skid prevention is not started until a lateral slip is relatively highly likely to occur.

The above driving force distribution control does not cause a deceleration in the vehicle body during the operation thereof and therefore, makes the driver feel less uncomfortable. In addition, driving forces can be distributed according to vertical loads on left and right drive wheels, and therefore, a yaw moment can be efficiently generated. However, the above driving force distribution control only distributes driving forces, and therefore, unless the vehicle is one which has a drive motor individually for each wheel, such as a so-called in-wheel motor vehicle, it is difficult to set a desired driving force for each wheel.

It is an object of the present invention to provide a vehicle electronic stability control system which allows a vehicle to have improved movement performance and limit performance (cornering performance limit) without causing a driver to feel uncomfortable and even during operation of electronic stability control in a situation where a lateral slip is relatively less likely to occur.

A description will now be given with reference to reference numerals in embodiments for the sake of convenience and for ease of understanding.

A vehicle electronic stability control system according to one aspect of the present invention is an electronic stability control system 5 for a vehicle 100, the vehicle 100 having a plurality of wheels including at least a pair of left and right drive wheels 1, 1 (2, 2), wherein the vehicle 100 has

- motors 3, 3 for individually driving the pair of left and right drive wheels 1, 1 (2, 2), respectively,
- a detection device 30 configured to detect at least one predetermined vehicle behavior, and
- friction brakes 4 each configured to apply a frictional braking force to the respective one of the plurality of drive wheels 1 and 2, and the electronic stability control system 5 includes:

- a stability determination module 20 configured to obtain information indicating the vehicle behavior from the detection device 30, and to determine whether or not the vehicle 100 is in an unstable state or in a less stable state before the unstable state is reached, on the basis of the obtained information indicating the vehicle behavior; and
- a braking/driving force control module 21 configured to, when the stability determination module 20 determines that the vehicle 100 is in the unstable state or in the less stable state, apply, to one drive wheel 1 (2) of the pair of left and right drive wheels 1, 1 (2, 2), a braking force using one of or both a regenerative brake of the motor 3 associated with the one drive wheel and the friction brake 4 associated with the one drive wheel 1 (2), and simultaneously apply a driving force to the motor 3 for the other drive wheel 1 (2).

The information indicating the vehicle behavior includes, for example, a yaw rate, sideslip angle, vehicle speed, and/or lateral acceleration. These are selected and used according to the type of a sideslip state.

The unstable state includes a state in which the vehicle is in an oversteer state or in an understeer state. The oversteer state refers to a state in which the frictional force between the rear wheel 2 and the ground exceeds the maximum frictional force that can be generated therebetween, so that the rear wheel 2 slips laterally. The understeer state refers to a state in which the frictional force between the front wheel

1 and the ground exceeds the maximum frictional force that can be generated therebetween, so that the front wheel 1 slips laterally.

The less stable state refers to a state which is before the vehicle reaches the unstable state and in which the information indicating the predetermined vehicle behavior has a value greater than or equal to a threshold. The threshold is set on the basis of the results of tests, simulations, or the like, for example.

According to this configuration, while the vehicle is traveling, detection devices 11 to 14 each constantly or continuously obtain information indicating corresponding vehicle behavior, for example. The stability determination module 20 determines whether or not the vehicle is in the unstable state or in the less stable state, on the basis of the information indicating the vehicle behavior. While the vehicle is not in the unstable state or in the less stable state, the braking/driving force control module 21 applies no braking/driving force and, for example, a first control device 7, which is a higher-level control device than a second control device 6 including the electronic stability control system, provides a torque command value corresponding to an amount of operation of an accelerator operating device 9 or the like to the second control device 6. Thus, the second control device 6 performs normal control to drive the motors 3.

While the vehicle is in the unstable state or in the less stable state, the braking/driving force control module 21 applies a braking force to one of the drive wheels 1 (2) using the regenerative brake of the motor 3 or the friction brake 4. Simultaneously the braking/driving force control module 21 applies a determined driving force for skid prevention to the motor 3 associated with the other drive wheel 1 (2). Since the braking force and the driving force are applied as described above, unlike the conventional technique of applying only a braking force to a wheel to be controlled, a deceleration is not caused in a vehicle body, so that the electronic stability control is performed without causing a driver to feel uncomfortable.

Therefore, the electronic stability control can be activated from the less stable state in which a lateral slip is relatively less likely to occur, resulting in an improvement in safety without a decrease in the movement performance of the vehicle. In addition, compared to the case where a braking force is applied only to die drive wheel 1, the magnitude (absolute value) of a braking/driving force per wheel can be reduced, and therefore, the tire load rate can be made uniform, resulting in an improvement in vehicle stability. Furthermore, when the vehicle is in the unstable state and the sideslip degree is high, a deceleration is generated while a yaw moment is generated, and therefore, the cornering center of the vehicle can be made at the forward part of the vehicle, resulting in an improvement in course tracing performance, for example.

In the case that the regenerative brake of the motor 3 is used to apply a braking force, the kinetic energy of the vehicle is converted into electric energy, which can then be used. Therefore, compared to the case where only the friction brake 4 is used, a decrease in electrical efficiency is reduced.

The determination by the stability determination module 20 as to whether or not the vehicle is in the unstable state or in the less stable state may include determination as to whether or not the vehicle is in the understeer state. When the stability determination module 20 determines that the vehicle is in the understeer state, the braking/driving force control module 21 may apply a braking force to a cornering inner wheel (referred to as an “inner rear wheel”) 2 on a curved travel path, of the pair of left and right rear drive wheels 2, 2, and simultaneously apply a driving force to a cornering outer wheel (referred to as an “outer rear wheel”) 2 on the curved travel path, of the pair of left and right rear drive wheels.

When the stability determination module 20 determines that the to vehicle is in the understeer state, the braking/driving force control module 21 determines temporary command values having the same absolute value for a braking force to the inner rear wheel 2 and a driving force to the outer rear wheel 2. The stability determination module 20 further has a sideslip degree calculator 24 which calculates a sideslip degree. The sideslip degree calculator 24 determines a target deceleration rate in accordance with the sideslip degree and adds a decelerating force corresponding to the target deceleration rate to the temporary braking/driving force command values for the respective outer rear and inner rear wheels 2. The sideslip degree may be calculated from the magnitude of a deviation (sideslip angle deviation) obtained by comparing an actual sideslip angle with a reference or desired sideslip angle calculated from a steering angle, a vehicle speed, and the like on the basis of a vehicle model. The plus or minus sign of the sideslip angle depends on the cornering direction, and therefore, the cornering direction is taken into consideration in the calculation of the sideslip degree.

A relationship between the magnitude of the sideslip angle deviation and the sideslip degree is determined on the basis of the results of experiments, simulations, or the like.

The target deceleration rate may be set to zero while the sideslip degree is relatively low, and may be set to higher as the sideslip degree increases. As a result, while the sideslip degree is high, a deceleration is caused, and therefore, the cornering center can be made at the forward part of the vehicle, resulting in an improvement in course tracing performance.

The detection device may include a vehicle speed detection device 12 configured to detect a vehicle speed, a steering angle sensor 11 configured to detect a steering angle, and a yaw rate sensor 13 configured to detect a yaw rate. The stability determination module 20 may calculate a yaw rate deviation that is a deviation between a reference or desired yaw rate and the yaw rate detected by the yaw rate sensor 13. The reference yaw rate is obtained on the basis of the vehicle speed detected by the vehicle speed detection device 12 and the steering angle detected by the steering angle sensor 11. The braking/driving force control module 21 may determine magnitudes of the braking force and the driving force to be applied, in accordance with the yaw rate deviation.

The determination by the stability determination module 20 as to whether or not the vehicle is in the unstable state or in the less stable state may include determination as to whether or not the vehicle is in the oversteer state. When the stability determination module 20 determines that the vehicle is in the oversteer state, the braking/driving force control module 21 may apply a braking force to a cornering outer wheel (referred to as an “outer front wheel”) 1 on a curved travel path, of the pair of left and right front drive wheels 1, 1, and simultaneously apply a driving force to a cornering inner wheel (referred to as an “inner front wheel”) 1 on the curved travel path, of the pair of left and right front drive wheels.

When the vehicle is in the oversteer state, the braking/driving force control module 21 applies a driving force to the inner front wheel 1 and a braking force to the outer front wheel 1, the driving force and the braking force having the same absolute value, so that the motors 3 provide a target yaw moment. As a result, an outward yaw moment is generated, and therefore, oversteer tendency can be reduced. In addition, unlike the conventional technique of applying only a braking force, a deceleration is not caused, and therefore, even if a threshold which is a condition for taking measures to prevent a skid is set to low in the electronic stability control, the driver does not feel uncomfortable and the movement performance does not decrease.

When the vehicle is in the unstable state and the sideslip degree is high, the sideslip degree calculation unit 24 may determine a target deceleration rate in accordance with the sideslip degree, and add a decelerating force corresponding to the target decelerating rate to the braking/driving force command values for the outer front wheel 1 and the inner front wheel 1, as in the case of the understeer state. Thus, the braking/driving force distributor 26 adds a braking force corresponding to a sideslip degree as described above to generate a deceleration, so that the cornering center can be made at the forward part of the vehicle, resulting in an improvement in course tracing performance.

The detection device may include a vehicle speed detection device 12 configured to detect a vehicle speed, a lateral acceleration sensor 14 configured to detect a lateral acceleration, and a yaw rate sensor 13 configured to detect a yaw rate. The stability determination module 20 may calculate a sideslip angle change rate deviation that is a deviation between a threshold and a sideslip angle change rate dβ/dt. The sideslip angle change rate dβ/dt is obtained on the basis of the vehicle speed detected by the vehicle speed detection device 12, the lateral acceleration detected by the lateral acceleration sensor 14, and the yaw rate detected by the yaw rate sensor 13. The braking/driving force control module 21 may determine magnitudes of the braking force and the driving force to be applied, in accordance with the sideslip angle change rate deviation.

The threshold is set on the basis of the results of experiments or simulations, for example.

When the stability determination module 20 determines that the vehicle is in the oversteer state or in the understeer state, the braking/driving force control module 21 may apply a braking force and a driving force having the same absolute value to respective ones of the pair of left and right drive wheels, Compared to the case where a braking force is applied to only one wheel, the absolute value of a braking/driving force per wheel can be reduced, and therefore, the tire load rate can be made uniform, resulting in an improvement in vehicle stability.

The braking/driving force control module 21 may apply the braking force by a regenerative torque of the motor 3 associated with the wheel to which the braking force is to be applied. A driving force and a braking force are not generated by separate devices, for example, a driving force distribution device and a mechanical brake, but the motors 3 is used to apply a driving force and a braking force. Therefore, the driver is unlikely to feel uncomfortable at the time of switching between a driving force and a braking force. In addition, when a braking force is applied by the regenerative torque of the motor 3, the kinetic energy of the vehicle is converted into electric energy, which can then be used. Therefore, compared to the case where only the friction brake 4 is used, a decrease in electrical efficiency is reduced.

The braking/driving force control module 21 may include a braking force determination module **26*a* configured to determine whether or not a target braking force exceeds a maximum braking force that the motor 3 is capable of generating, and a braking force shortfall addition module 26*b* configured to, when the braking force determination module 26*a* determines that the target braking force exceeds the maximum braking force, apply the excess braking force to the wheel to which the braking force is to be applied, using the friction brake 4. The braking force provided by the motor 3 can be used to the extent possible. Therefore, compared to the case where only the friction brake 4** is used to apply a braking force, electrical efficiency is improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

In the accompanying drawings, like reference numerals are used to denote like parts throughout the several views, and:

FIG. 3 is a control block diagram of the electronic stability control system of FIG. 1;

DESCRIPTION OF EMBODIMENTS

A vehicle electronic stability control system according to a first embodiment of the present invention will be described with reference to FIGS. 1 to 5.

Figure 1:
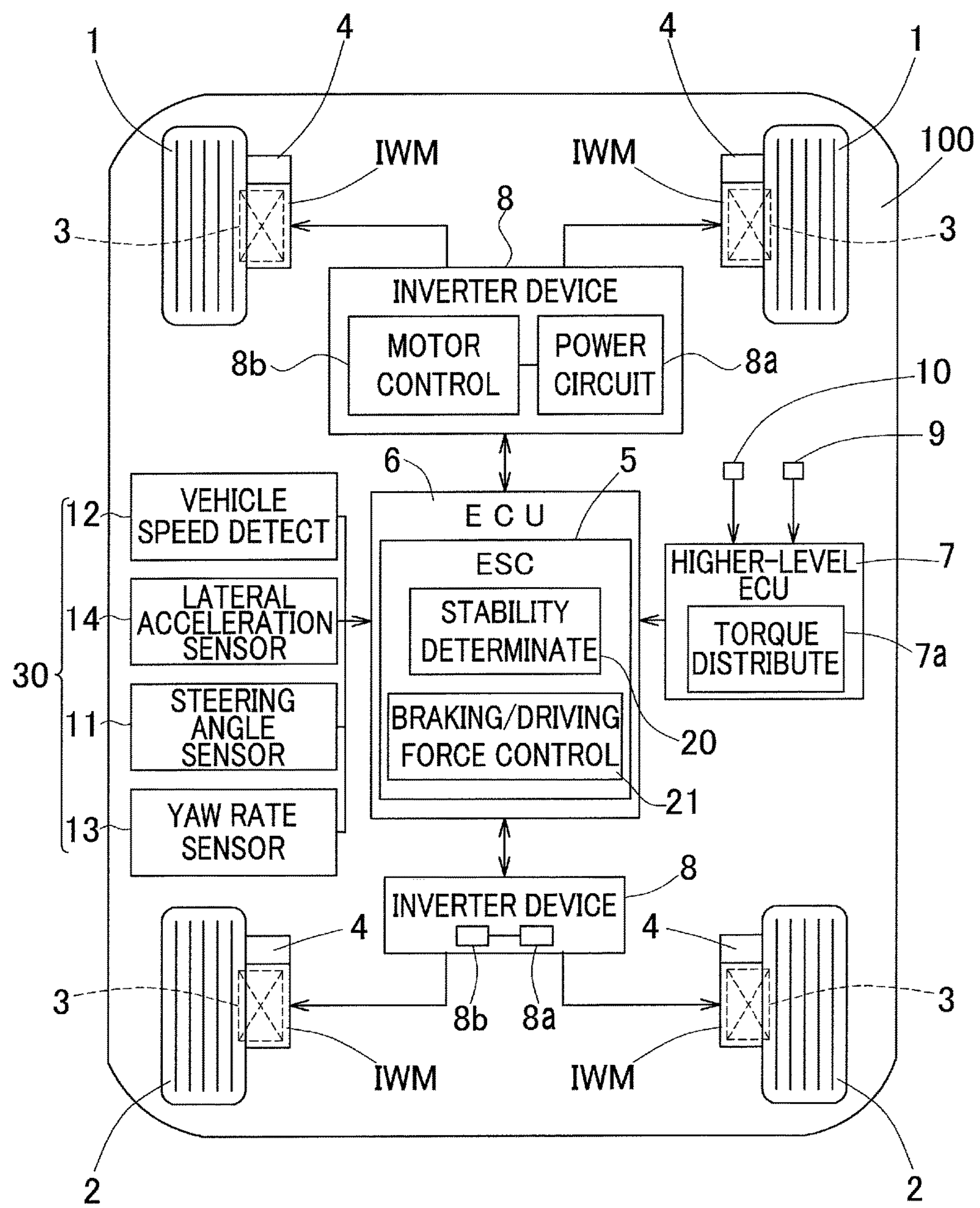
FIG. 1 is a plan view schematically showing a system configuration of a vehicle electronic stability control system according to a first embodiment of is the present invention.

FIG. 1 is a plan view schematically showing a system configuration of the vehicle electronic stability control system 5. The electronic stability control system 5 is for preventing a vehicle from skidding. In this embodiment, a vehicle 100 is a four-wheel drive automobile which includes the electronic stability control system 5. The vehicle 100 includes a pair of left and right front wheels 1, 1 and a pair of left and right rear wheels 2, 2. The wheels are individually driven by the respective motors 3.

Each motor 3 includes an in-wheel motor drive device IWM described below. The pair of left and right front wheels 1, 1 can be turned by a turning mechanism (not shown), and are steered by a steering wheel through the turning mechanism. This vehicle includes friction brakes 4 which apply frictional braking forces to the respective wheels 1 and 2. Each friction brake 4 may include a hydraulic or electric mechanical brake.

The vehicle has a control system including: an ECU 6 including an ESC 5; a higher-level ECU 7 which is higher-level control device than the ECU 6; and inverter devices 8. The ECU 6 and the higher-level ECU 7 each include a computer, a program executable by the computer, various electronic circuits and the like. The higher-level ECU 7 is, for example, an electronic control unit which performs coordinated control and centralized control of the entire vehicle. The higher-level ECU 7 includes a torque distribution module 7*a*. The torque distribution module 7*a* receives an acceleration command from an accelerator operating device 9, and a deceleration command from a brake operating device 10. The torque distribution module 7*a* distributes a braking/driving command corresponding to the difference between the acceleration command and the deceleration command to the motors 3 through the ECU 6 and the respective inverter devices 8. The braking/driving command is, for example, a torque command.

Each of the inverter devices 8 has a power circuit unit 8*a* provided for the associated motor 3, and a motor control unit 8*b* which controls the power circuit unit 8*a*. The power circuit units 8*a* can be independently controlled so that different motor torques are provided. Each motor control unit 8*b* outputs, to the ECU 6, various kinds of information such as detected values, control values, and the like related to the in-wheel motor drive devices IWM associated therewith. Each motor control unit 8*b* also converts a braking/driving torque command value inputted from the ECU 6 into an electric current command to be outputted to a PWM driver of the power circuit unit 8*a*.

This vehicle includes at least one detection device 30. This detection device may include a steering angle sensor 11 which detects a steering angle, a vehicle speed detection device 12 which detects a vehicle speed, a yaw rate sensor 13 which detects a yaw rate, and a lateral acceleration sensor 14 which detects a lateral acceleration.

Figure 2:
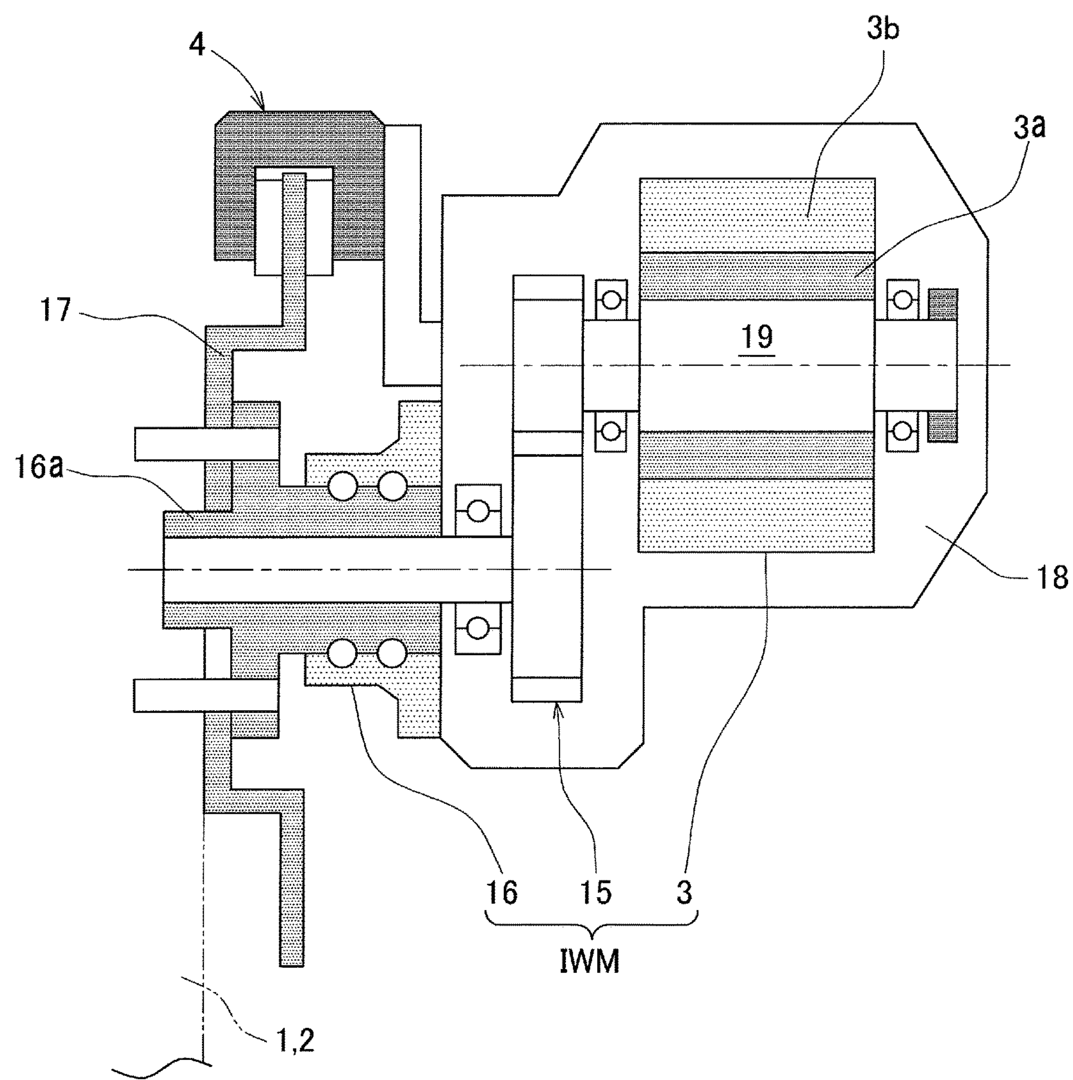
FIG. 2 is a cross-sectional view of an in-wheel motor drive device in the vehicle of FIG. 1.

FIG. 2 is a cross-sectional view of the in-wheel motor drive device IWM. Each in-wheel motor drive device IWM has the motor 3, a speed reducer 15, and a wheel bearing 16, which are partly of entirely disposed within the wheel. The rotation of the motor 3 is transferred to the drive wheel 1 (2) through the speed reducer 15 and the wheel bearing 16. A brake rotor 17 is fixed to a flange portion of a hub ring 16*a* of the wheel bearing 16, so that the brake rotor 17 rotates together with the drive wheel 1 (2). The motor 3 is, for example, an embedded magnet synchronous motor in which a permanent magnet is incorporated in a core portion of a rotor 3*a*. In the motor 3, a radial gap is provided between a stator 3*b* fixed to a housing 18 and the rotor 3*a* attached to a rotation output shaft 19.

FIG. 3 is a control block diagram of the electronic stability control system 5. In the following description, FIG. 1 is also referred to as appropriate. FIG. 3 shows yaw rate feedback control. The electronic stability control system 5 has a stability determination module 20 and a braking/driving force control module 21. That is, the stability determination module 20 and the braking/driving force control module 21 are provided in the ESC 5. The stability determination module 20 obtains information indicating at least one predetermined vehicle behavior, from the detection device 30, and determines whether or not the vehicle is in an unstable state or in a less stable state before the unstable state is reached, on the basis of the obtained information indicating the vehicle behavior.

The stability determination module 20 has a reference yaw rate calculation unit 22, a controller 23, a reference sideslip angle calculation unit 29, a sideslip degree calculator 24, and a stability determiner 25. In the yaw rate feedback control shown in FIG. 3, the reference yaw rate calculation unit 22 calculates the following reference yaw rate $\gamma_{ref}$ from a vehicle speed V detected by the vehicle speed detection device 12 and a steering angle $\delta_h$ detected by the steering angle sensor 11, using a vehicle model.

$$\gamma_{ref}(s) = G_\delta^\gamma(0)\frac{\omega_n^2(T_\gamma s + 1)}{s^2 + 2\omega_n \varsigma s + \omega_n^2}\delta_h(s) \quad \text{[Math. 1]}$$

where $G_\delta^\gamma(0)$ is a yaw rate gain constant, $\omega_n$ is the natural frequency of the vehicle, $\zeta$ is a damping ratio, and $T_\gamma$ is a constant. The natural frequency $\omega_n$ of the vehicle and the damping ratio $\zeta$ depend on the vehicle speed V.

A deviation calculation unit 31 calculates a deviation (yaw rate deviation $\Delta\gamma$ between the reference yaw rate $\gamma_{ref}$ calculated above and an actual yaw rate $\gamma$ detected by the yaw rate sensor 13.

Alternatively, in sideslip angle change rate feedback control, a sideslip angle change rate $d\beta/dt$ is calculated using the following equation, and a deviation (sideslip angle change rate deviation) $\Delta(d\beta/dt)$) from a preset threshold is calculated by the deviation calculation unit 31.

$$\frac{d\beta}{dt} = \gamma - \frac{G_y}{V} \quad \text{[Math. 2]}$$

where $G_\gamma$ represents a yaw rate gain.

The controller 23 determines a target yaw moment $M_t$ on the basis of the yaw rate deviation $\Delta\gamma$ or the sideslip angle change rate deviation $\Delta(d\beta/dt)$. The yaw rate feedback control will now be described.

$$M_t = K_p\Delta\gamma + K_I\Sigma\Delta\gamma + K_D(\Delta\gamma(n-1) - \Delta\gamma(n))$$

where $K_p$, $K_I$, and $K_D$ are gain constants in proportion calculation, integration calculation, and differentiation calculation, respectively.

The stability determiner 25 determines whether or not the vehicle is in an oversteer state or in an understeer state, on the basis of information indicating a vehicle behavior, such as the yaw rate $\gamma$, the yaw rate deviation $\Delta\gamma$, is the vehicle speed V, the lateral acceleration, and the like. For example, if the absolute value of the actual yaw rate is lower than the absolute value of the reference yaw rate, the stability determiner 25 determines that the vehicle is in the understeer state. Also, if the sideslip change rate $d\beta/dt$ is greater than the preset threshold, the stability determiner 25 determines that the vehicle is in the oversteer state.

If the stability determination module 20 determines that the vehicle is in the unstable state or in the less stable state, e.g., the stability determination module 20 determines that the vehicle is in the oversteer state or in the understeer state, the braking/driving force control module 21 applies a braking force to one drive wheel 1 (2) of the pair of left and right drive wheels 1, 1 (2, 2) using one of or both a regenerative brake of the motor 3 and the friction brake 4 corresponding to that drive wheel 1 (2). Simultaneously the braking/driving force control module 21 applies a driving force to the motor 3 for the other drive wheel 1 (2).

Figure 5A:
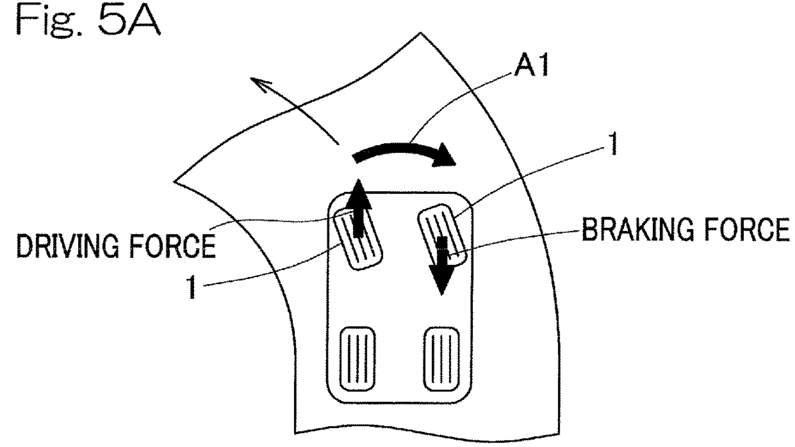
FIG. 5A is a diagram schematically showing a real vehicle test example when the vehicle of FIG. 1 or the like is oversteering.
Figure 5B:
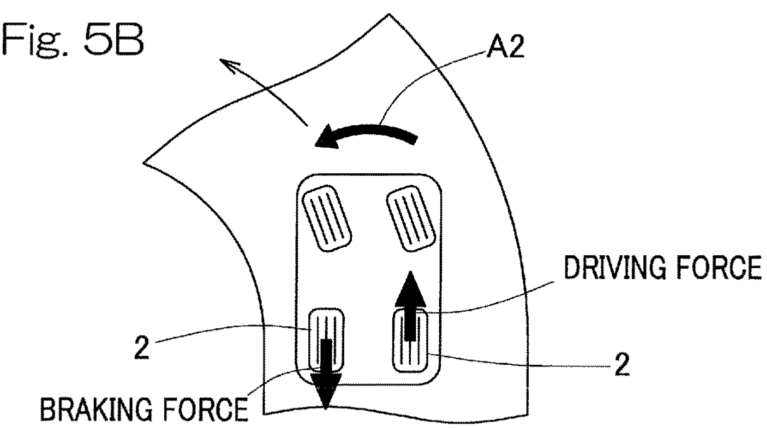
FIG. 5B is a diagram schematically showing a real vehicle test example when the vehicle of FIG. 1 or the like is understeering.

If the stability determiner 25 determines that the vehicle is in the understeer state, a braking/driving force distributor 26 calculates temporary braking/driving force command values having the same absolute value for a braking force to an inner rear wheel 2 and a driving force to an outer rear wheel 2 so that the braking force is to be applied to the inner rear wheel 2 and the driving force is to be applied to the outer rear wheel 2 (see FIG. 5B). Furthermore, the sideslip degree calculator 24 calculates a sideslip degree. The braking/driving force distributor 26 determines a target deceleration rate in accordance with the sideslip degree, and adds a decelerating force corresponding to the target deceleration rate to the temporary braking/driving force command values for the outer rear wheel 2 and the inner rear wheel 2.

The braking/driving force distributor 26 has a braking force determination module 26*a* and a braking force shortfall addition module 26*b*. The braking force determination module 26*a* determines whether a target command braking torque (target braking force) exceeds the maximum torque that can be outputted (the maximum braking force that can be generated) by the motor 3. The maximum output torque is determined by, for example, the rated output of the motor 3. If the command braking torque exceeds the maximum torque that can be outputted by the motor 3, the braking force shortfall addition module 26*b* applies the excess braking force using the friction brake 4 to the wheel 1 (2) to which the braking force is to be applied. With a great yaw moment, a deceleration is caused, but the vehicle can be stabilized by the deceleration.

The sideslip degree calculator 24 calculates a reference sideslip angle $\beta_{ref}$ from the vehicle speed V detected by the vehicle speed detection device 12 and the steering angle $\delta_h$ detected by the steering angle sensor 11, using a vehicle model.

$$\beta_{ref}(s) = G_\delta^\beta(0)\frac{\omega_n^2(T_\beta s + 1)}{s^2 + 2\omega_n\varsigma s + \omega_n^2}\delta_h(s) \quad \text{[Math. 3]}$$

where $G_\delta^\beta(0)$ is a sideslip angle gain constant, $\omega_n$ is the natural frequency of the vehicle, $\zeta$ is a damping ratio, and $T_\beta$ is a constant. The natural frequency $\omega_n$ of the vehicle and the damping ratio $\zeta$ depend on the vehicle speed V.

A deviation (sideslip angle deviation) $\Delta\beta$ between the reference sideslip angle $\beta_{ref}$ calculated above and an actual sideslip angle $\beta$ detected by a sideslip angle sensor 13 is calculated. A relationship between the magnitude of the deviation and the sideslip degree is predetermined on the basis of the results of experiments, simulations, or the like. The actual sideslip angle $\beta$ may be estimated by integration of the sideslip angle change rate $d\beta/dt$.

The sideslip degree is calculated from, for example, the magnitude of the sideslip angle as described above. The target deceleration rate may be set to zero when the sideslip degree is relatively low, and may be set to higher as the is sideslip degree increases.

By adding a decelerating force corresponding to the sideslip degree to the temporary braking/driving command values for the outer rear wheel 2 and the inner rear wheel 2, a deceleration is caused, and therefore, the cornering center can be made at the forward part of the vehicle, resulting in an improvement in course tracing performance.

Furthermore, since a deceleration is not caused while the sideslip degree is relatively low, the driver does not feel uncomfortable and the movement performance of the vehicle does not decrease. However, while the sideslip degree is high, a deceleration is caused, and therefore, the cornering center can be made at the forward part of the vehicle, resulting in an improvement in course tracing performance. During cornering, a load on a cornering inner wheel decreases, and therefore, in conventional electronic stability control in which only a braking force to an inner rear wheel is applied, a great braking force may not be generated, so that a sufficient yaw moment may not be generated. In contrast to this, in this control, a driving force to the outer rear wheel 2 is also applied, and therefore, a sufficient yaw moment can be reliably generated.

When the stability determiner 25 determines that the vehicle is in the oversteer state, the braking/driving force distributor 26 in the braking/driving force control module 21 applies a driving force to the inner front wheel 1 and a braking force to the outer front wheel 1, the driving force and the braking force having the same absolute value and different directions, so that the in-wheel motor drive devices IWM provide a target yaw moment (see FIG. 5A). As a result, an outward yaw moment A1 is generated in the vehicle (see FIG. 5A), and therefore, oversteer tendency can be reduced. In addition, a deceleration is not caused, and therefore, even if a threshold which is a condition for taking measures to prevent a skid is set to low in the electronic stability control, the driver does not feel uncomfortable and the movement performance does not decrease.

When the vehicle is in the unstable state and the sideslip degree is high, the target deceleration rate may be determined in accordance with the sideslip degree, and a decelerating force corresponding to the target deceleration rate may be added to the braking/driving force command values for the outer front wheel 1 and the inner front wheel 1, as in the case of the understeer state. Thus, the braking/driving force distributor 26 can add a braking force corresponding to a sideslip degree as described above to generate a deceleration, so that the cornering center can be made at the forward part of the vehicle, resulting in an improvement in course tracing performance.

A driving force and a braking force are generated not by separate devices, for example, a driving force distribution device and a mechanical brake, but by the in-wheel motor drive device IWM. Therefore, the driver is not likely to feel uncomfortable at the time of switching between a driving force and a braking force. In addition, when a braking force is applied by the regenerative torque of the motor 3, the kinetic energy of the vehicle is converted into electric energy, which can then be used. Therefore, compared to the case where only the friction brake 4 is used, a decrease in electrical efficiency is reduced.

Direct yaw moment (abbreviated to DYC) control may be performed by other control algorithms in a normal state where the stability of the vehicle is high. In this case, the braking/driving force control module 21 calculates a weighted sum of a driving force command value $T_{DYC}$ provided by DYC control performed by a DYC control unit 28 and a braking/driving force command value $T_{ESC}$ provided by the electronic stability control, as represented by the following equation, and adds the weighted sum to the braking/driving torque command value to obtain a braking/driving torque command value $T_{IWM}$ to the in-wheel motor drive device IWM.

$$T_{IWM}=(1-\alpha)T_{DYC}+\alpha T_{ESC}$$

where α is a weight coefficient.

The braking/driving torque command value to which the weighted sum is added is the value that is calculated according to amounts of operation of the accelerator operating device 9 or the brake operating device 10.

Figure 4:
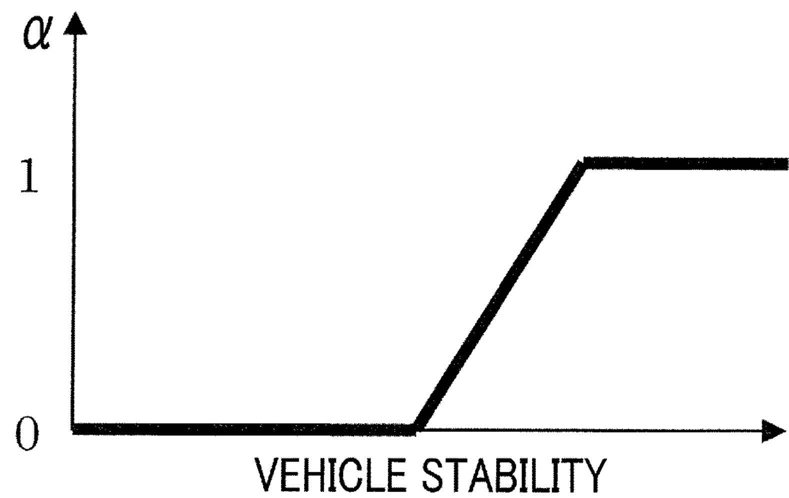
FIG. 4 is a diagram showing a relationship between the stability of the vehicle achieved by the electronic stability control system of FIG. 1 and a weight coefficient.

FIG. 4 is a diagram showing a relationship between the stability of the vehicle achieved by the electronic stability control system and the weight coefficient α. Regarding the weighting for the driving force command value $T_{DYC}$ and the braking/driving force command value $T_{ESC}$, only the driving force command value provided by the DYC control is weighted in a state where the vehicle stability is high. As the stability decreases, the proportion of the DYC driving force command value is decreased, and the proportion of the braking/driving force command value provided by the electronic stability control is increased.

As a result, the driving force command value provided by the DYC control and the braking/driving force command value provided by the electronic stability control is be smoothly changed without interference therebetween, and therefore, the driver is not likely to feel uncomfortable. The braking/driving torque command value $T_{IWM}$ is inputted to an anti-lock brake system (abbreviated to ABS)/traction control system (abbreviated to TCS) controller 27 in the inverter device 8. The ABS/TCS controller 27 performs anti-lock brake control and traction control to prevent the wheels 1 and 2 from being locked or spinning due to a braking/driving torque venerated by the electronic stability control.

The vehicle electronic stability control system may be implemented in a two-wheel drive vehicle in which a pair of left and right wheels, i.e., two wheels, are independently driven. In this case, oversteer tendency can be reduced in a front-wheel drive vehicle in which a pair of left and right front wheels, i.e., two wheels, are independently driven. Understeer tendency can be reduced in a rear-wheel drive vehicle in which a pair of left and right rear wheels, i.e., two wheels, are independently driven.

In the in-wheel motor drive device, a cycloidal speed reducer, a planetary speed reducer, a speed reducer with two parallel shafts, and other speed reducers can be employed. Alternatively, the in-wheel motor drive device may be of a so-called direct motor type in which a speed reducer is not employed.

The respective units included in the stability determination module 20 and the braking/driving force control module 21, i.e., the reference yaw rate calculation unit 22, the stability determiner 25, the controller 23, the reference sideslip angle calculation unit 29 and the sideslip degree calculator 24, and the braking/driving force distributor 26, are preferably implemented by a processor executing a software program. Alternatively, the above units may be implemented by a combination of an adder, a subtractor, a differentiator, an integrator, and/or a comparator, or the like, so that the units can be implemented by hardware.

The present invention is in no way limited to the above embodiments. Various additions, changes, or deletions can be made thereto without departing from the spirit and scope of the present invention.

REFERENCE NUMERALS

1 . . . front wheel (drive wheel)
2 . . . rear wheel (drive wheel)
3 . . . motor
4 . . . friction brake
30 (11, 12, 13, 14) . . . detection device
20 . . . stability determination module
21 . . . braking/driving force control module

What is claimed is:

1. An electronic stability control system for vehicle comprising a plurality of wheels including at least a pair of left and right drive wheels, wherein the vehicle has motors for individually driving the pair of left and right drive wheels, respectively, a sensor configured to detect at least one predetermined vehicle behavior, and friction brakes each configured to apply a frictional braking force to the respective one of the plurality of drive wheels, and the electronic stability control system comprises:

a stability determination module configured to obtain information indicating the vehicle behavior from the sensor, and to determine whether or not the vehicle is in an unstable state or in a less stable state before the unstable state is reached, on the basis of the obtained information indicating the vehicle behavior; and a braking/driving force control module configured to, when the stability determination module determines that the vehicle is in the unstable state or in the less stable state, apply, to one drive wheel of the pair of left and right drive wheels, a braking force using one of or both a regenerative brake of the motor associated with the one drive wheel and the friction brake associated with the one drive wheel, and simultaneously apply a driving force to the motor for the other drive wheel, the pair of left and right drive wheels include a pair of left and right front drive wheels of the plurality of drive wheels, the determination by the stability determination module as to whether or not the vehicle is in the unstable state or in the less stable state includes determination as to whether or not the vehicle is in an oversteer state, and when the stability determination module determines that the vehicle is in the oversteer state, the braking/driving force control module applies a braking force to a cornering outer wheel on a curved travel path, of the pair of left and right front drive wheels, and simultaneously applies a driving force to a cornering inner wheel on the curved travel path, of the pair of left and right front drive wheels, the applied braking force and the driving force having the same absolute value.

2. The electronic stability control system as claimed in claim 1, wherein the sensor includes a vehicle speed sensor configured to detect a vehicle speed, a lateral acceleration sensor configured to detect a lateral acceleration, and a yaw rate sensor configured to detect a yaw rate, the stability determination module calculates a sideslip angle change rate deviation that is a deviation between a threshold and a sideslip angle change rate, the sideslip angle change rate being obtained on the basis of the vehicle speed detected by the vehicle speed sensor, the lateral acceleration detected by the lateral acceleration sensor, and the yaw rate detected by the yaw rate sensor, and the braking/driving force control module determines magnitudes of the braking force and the driving force to be applied, in accordance with the sideslip angle change rate deviation.

3. The electronic stability control system as claimed in claim 1, wherein the sensor includes a vehicle speed sensor configured to detect a vehicle speed, a steering angle sensor configured to detect a steering angle, and a yaw rate sensor configured to detect a yaw rate, the stability determination module calculates a yaw rate deviation that is a deviation between a reference yaw rate and the yaw rate detected by the yaw rate sensor, the reference yaw rate being obtained on the basis of the vehicle speed detected by the vehicle speed sensor and the steering angle detected by the steering angle sensor, and the braking/driving force control module determines magnitudes of the braking force and the driving force to be applied, in accordance with the yaw rate deviation.

4. The electronic stability control system as claimed in claim 1, wherein the sensor includes a vehicle speed sensor configured to detect a vehicle speed, a lateral acceleration sensor configured to detect a lateral acceleration, a steering angle sensor configured to detect a steering angle, and a yaw rate sensor configured to detect a yaw rate, the stability determination module calculates a sideslip angle change rate deviation that is a deviation between a threshold and a sideslip angle change rate and a yaw rate deviation that is a deviation between a reference yaw rate and the yaw rate detected by the yaw rate sensor, the sideslip angle change rate being obtained on the basis of the vehicle speed detected by the vehicle speed sensor, the lateral acceleration detected by the lateral acceleration sensor, and the yaw rate detected by the yaw rate sensor, the reference yaw rate being obtained on the basis of the vehicle speed detected by the vehicle speed sensor and the steering angle detected by the steering angle sensor, and the braking/driving force control module determines magnitudes of the braking force and the driving force to be applied, in accordance with one of or both the sideslip angle change rate deviation and the yaw rate deviation.

5. The electronic stability control system as claimed in claim 1, wherein the braking/driving force control module applies the braking force by a regenerative torque on the motor associated with the wheel to which the braking force is to be applied.

6. The electronic stability control system as claimed in claim 5, wherein the braking/driving force control module includes a braking force determination module configured to determine whether or not a target braking force exceeds a maximum braking force that the motor is capable of generating, and a braking force shortfall addition module configured to, when the braking force determination module determines that the target braking force exceeds the maximum braking force, apply the excess braking force to the wheel to which the braking force is to be applied, using the friction brake.

7. The electronic stability control system as claimed in claim 1, wherein the stability determination module has a sideslip degree calculation unit configured to calculate a sideslip degree of drive wheels, and the braking/driving force control module has a braking/driving force distributor configured to add a braking force to the braking force and the driving force to be applied to the respective ones of the pair of left and right drive wheels to cause a deceleration as the function of the sideslip degree calculated by the sideslip degree calculation unit.

8. An electronic stability control system for vehicle comprising a plurality of wheels including at least a pair of left and right drive wheels, wherein the vehicle has motors for individually driving the pair of left and right drive wheels, respectively, a sensor configured to detect at least one predetermined vehicle behavior, and friction brakes each configured to apply a frictional braking force to the respective one of the plurality of drive wheels, and the electronic stability control system comprises:

a stability determination module configured to obtain information indicating the vehicle behavior from the sensor, and to determine whether or not the vehicle is in an unstable state or in a less stable state before the unstable state is reached, on the basis of the obtained information indicating the vehicle behavior; and a braking/driving force control module configured to, when the stability determination module determines that the vehicle is in the unstable state or in the less stable state, apply, to one drive wheel of the pair of left and right drive wheels, a braking force using one of or both a regenerative brake of the motor associated with the one drive wheel and the friction brake associated with the one drive wheel, and simultaneously apply a driving force to the motor for the other drive wheel, the pair of left and right drive wheels include a pair of left and right rear drive wheels of the plurality of wheels, the determination by the stability determination module as to whether or not the vehicle is in the unstable state or in the less stable state includes determination as to whether or not the vehicle is in an understeer state, and when the stability determination module determines that the vehicle is in the understeer state, the braking/driving force control module applies a braking force to a cornering inner wheel on a curved travel path, of the pair of left and right rear drive wheels, and simultaneously applies a driving force to a cornering outer wheel on the curved travel path, of the pair of left and right rear drive wheels, the applied braking force and the driving force having the same absolute value.

9. The electronic stability control system as claimed in claim 8, wherein the stability determination module has a sideslip degree calculation unit configured to calculate a sideslip degree of drive wheels, and the braking/driving force control module has a braking/driving force distributor configured to add a braking force to the braking force and the driving force to be applied to the respective ones of the pair of left and right drive wheels to cause a deceleration as the function of the sideslip degree calculated by the sideslip degree calculation unit.

10. The electronic stability control system as claimed in claim 8, wherein the sensor includes a vehicle speed sensor configured to detect a vehicle speed, a steering angle sensor configured to detect a steering angle, and a yaw rate sensor configured to detect a yaw rate, the stability determination module calculates a yaw rate deviation that is a deviation between a reference yaw rate and the yaw rate detected by the yaw rate sensor, the reference yaw rate being obtained on the basis of the vehicle speed detected by the vehicle speed sensor and the steering angle detected by the steering angle sensor, and the braking/driving force control module determines magnitudes of the braking force and the driving force to be applied, in accordance with the yaw rate deviation.

11. The electronic stability control system as claimed in claim 8, wherein the sensor includes a vehicle speed sensor configured to detect a vehicle speed, a lateral acceleration sensor configured to detect a lateral acceleration, a steering angle sensor configured to detect a steering angle, and a yaw rate sensor configured to detect a yaw rate, the stability determination module calculates a sideslip angle change rate deviation that is a deviation between a threshold and a sideslip angle change rate and a yaw rate deviation that is a deviation between a reference yaw rate and the yaw rate detected by the yaw rate sensor, the sideslip angle change rate being obtained on the basis of the vehicle speed detected by the vehicle speed sensor, the lateral acceleration detected by the lateral acceleration sensor, and the yaw rate detected by the yaw rate sensor, the reference yaw rate being obtained on the basis of the vehicle speed detected by the vehicle speed sensor and the steering angle detected by the steering angle sensor, and the braking/driving force control module determines magnitudes of the braking force and the driving force to be applied, in accordance with one of or both the sideslip angle change rate deviation and the yaw rate deviation.

12. The electronic stability control system as claimed in claim 8, wherein the braking/driving force control module applies the braking force by a regenerative torque on the motor associated with the wheel to which the braking force is to be applied.

13. The electronic stability control system as claimed in claim 12, wherein the braking/driving force control module includes a braking force determination module configured to determine whether or not a target braking force exceeds a maximum braking force that the motor is capable of generating, and a braking force shortfall addition module configured to, when the braking force determination module determines that the target braking force exceeds the maximum braking force, apply the excess braking force to the wheel to which the braking force is to be applied, using the friction brake.

* * * * *